United States Patent Office 3,218,306
Patented Nov. 16, 1965

3,218,306
SHORTSTOPPING ORGANOMETALLIC POLYMERIZED BUTADIENE WITH AN OXIRANE COMPOUND OR ANHYDRIDE
Henry L. Hsieh and Charles W. Strobel, Bartlesville, Okla., assignors to Phillips Petroleum Company, a corporation of Delaware
No Drawing. Filed June 11, 1962, Ser. No. 201,283
13 Claims. (Cl. 260—94.3)

This invention relates to a method of terminating the polymerization of butadiene by inactivating an organometallic catalyst. In another aspect it relates to a method of reducing the tendency of butadiene to cold flow by the use of a special type of catalyst inactivating agent. Still another aspect of this invention relates to a method for shortstopping a butadiene polymerization in such a manner that the resulting product has improved color. In still another aspect the invention relates to the improved polymer resulting from this method of terminating the polymerization.

In recent years a great number of advances have been made in the production of rubbery polymers, many of these stemming from the discovery of new catalyst systems for the polymerization of monomeric materials such as butadiene. One superior product recently developed is a polybutadiene which contains a high percentage, for example 85 percent or more, cis-1,4 configuration. This is a rubbery polymer which is highly suitable for the fabrication of heavy duty tires and many articles for which conventional rubber has heretofore been unsatisfactory. Commercialization of this superior product has been retarded to some extent because of difficulties encountered in packaging, shipping and storing it, stemming from the fact that high cis-polybutadiene has a tendency to cold-flow in the unvulcanized state. For example, if cracks or punctures develop in the package used for storing the polymer, polymer will flow from the package with the resulting product loss or contamination, or causing several of the packages to stick together. Another problem is encountered with this polymer when attempting to extrude compounded stock employing conventional recipes. The extrusion rates tend to be low and the edges of the extrudate are rough. Processing problems of this type are generally not encountered with the more conventional butadiene/styrene copolymers of comparable Mooney viscosity.

We have now discovered that the problems of cold flow of cis-polybutadiene can be substantially reduced and the polymer greatly improved in processability and also frequently in color by shortstopping the polymerization reaction with an oxirane compound or an anhydride. Rubbery polymers of cis-polybutadiene having Mooney values in the range from about 10 to 60 (ML–4 at 212° F.) can be readily obtained according to this method without serious problems in handling and processing. Mono- and polyepoxy compounds (the oxiranes) and mono- and polyanhydrides as well as compounds which contain both epoxy and anhydride groups can be used.

In the polymerization of butadiene in the presence of organometallic catalyst the reaction is normally terminated or shortstopped when conversion has reached the desired level by the addition to the polymerization mixture of a catalyst inactivating agent. Compounds which have been used for this service include materials such as water, alcohols and rosin acid. While these materials are effective shortstopping agents the products produced are all substantially the same as regards cold flow, color and processability. It was quite surprising, therefore, to find that oxiranes and anhydrides were not only effective as shortstopping agents but also performed other very important functions in improving the properties of the recovered polymer. In addition to the improvements in cold flow and processability, the products are frequently lighter in color. The valuable properties which are characteristic of cis-polybutadiene vulcanizates are retained.

It is an object of our invention to provide a method of terminating the polymerization of butadiene which is carried out in the presence of an organometallic catalyst. Another object of our invention is to provide a method of shortstopping butadiene polymerization employing a catalyst containing an organometal and iodine-containing component in such a manner that the recovered polymer has a reduced tendency to cold flow in the unvulcanized state. Still another object of our invention is to provide a method of producing high cis-polybutadiene with a substantially reduced tendency for this polymer to cold flow. Another object is to provide this polymer with improved color and processability. Other objects and advantages and features of our invention will be apparent to those skilled in the art from the following discussion.

The process of our invention can be applied broadly to butadiene polymerization which is carried out in the presence of a catalyst system which includes an organometal and iodine present in the free state or in a compound. The method is particularly applicable to systems which produce butadiene polymers having a high percentage of cis-1,4 configuration since it is these polymers which have outstanding properties when cured but are subject to cold flow in the unvulcanized state. In referring to cis-polybutadiene we intend those polymers which contain at least 85 percent cis-1,4 addition, for example, from about 85 to 98 percent or more. Polymers of this type can be prepared by polymerizing 1,3-butadiene with any one of a large number of different stereo-specific catalyst systems.

It is preferred that our invention be practiced with a catalyst which is selected from the group consisting of (1) a catalyst which forms on mixing an organometal compound having the formula $R''_mM$, wherein $R''$ is alkyl, cycloalkyl, aryl, alkaryl, aralkyl, alkylcycloalkyl, arylcycloalkyl or cycloalkylalkyl, M is aluminum, mercury, zinc, beryllium, cadmium, magnesium, sodium or potassium, and $m$ is equal to the valence of the metal M, and titanium tetraiodide, (2) a catalyst which forms on mixing an organometal compound having the formula $R''_nM'$, wherein $R''$ is an organo radical as defined above, M' is aluminum, magnesium, lead, sodium or potassium, and $n$ is equal to the valence of the metal M', titanium tetrachloride and titanium tetraiodide, (3) a catalyst which forms on mixing an organometal compound having the formula $R''_3Al$ or $R''_2Mg$, wherein $R''$ is an organo radical as defined above, a compound having the formula $TiX_a$, wherein X is chlorine or bromine and $a$ is an integer from 2 to 4, inclusive, and elemental iodine, (4) a catalyst which forms on mixing an organometal compound having the formula $R''_xM''$, wherein $R''$ is an organo radical as defined above, $M''$ is aluminum, gallium, indium or thallium, and $x$ is equal to the valence of the metal $M''$, a titanium halide having the formula $TiX_4$, wherein X is chlorine or bromine, and an inorganic halide having the formula $M'''I_b$, wherein $M'''$ is beryllium, zinc, cadmium, aluminum, gallium, indium, thallium, silicon, germanium, tin, lead, phosphorus, antimony, arsenic, and bismuth, and $b$ is an integer from 2 to 5, inclusive, and (5) a catalyst which forms on mixing an organo compound having the formula $R''_xM''$, wherein $R''$, $M''$, and $x$ are as defined above, titanium tetraiodide, and an inorganic halide having the formula $M^{iv}X_c$, wherein $M^{iv}$ is aluminum, gallium, indium, thallium, germanium, tin, lead, phosphorus, antimony, arsenic and bismuth, X is chlorine or bromine, and $c$ is an integer from 2 to 5, inclusive. The R" radicals of the aforementioned formulas preferably contain up to and including 20 carbon atoms.

The following are examples of preferred catalyst systems which can be used to polymerize 1,3-butadiene to a cis 1,4-polybutadiene: triisobutylaluminum and titanium tetraiodide; triethylaluminum and titanium tetraiodide; triisobutylaluminum, titanium tetrachloride and titanium tetraiodide; triethylaluminum, titanium tetrachloride and titanium tetraiodide; diethylzinc and titanium tetraiodide; dibutylmercury and titanium tetraiodide; triisobutylaluminum, titanium tetrachloride and iodine; triethylaluminum, titanium tetrabromide and iodine; n-amylsodium and titanium tetraiodide; phenylsodium and titanium tetraiodide; n-butylpotassium and titanium tetraiodide; phenylpotassium and titanium tetraiodide; n-amylsodium, titanium-tetrachloride and titanium tetraiodide; triphenylaluminum and titanium tetraiodide; triphenylaluminum, titanium tetraiodide and titanium tetrachloride; triphenylaluminum, titanium tetrachloride and iodine; tri-alpha-naphthylaluminum, titanium tetrachloride and iodine; tribenzylaluminum, titanium tetrabromide and iodine; diphenylzinc and titanium tetraiodide; di-2-tolylmercury and titanium tetraiodide; tricyclohexylaluminum, titanium tetrachloride and titanium tetraiodide; ethylcyclopentylzinc and titanium tetraiodide; tri(3-isobutylcyclohexyl)aluminum and titanium tetraiodide; tetraethyllead, titanium tetrachloride and titanium tetraiodide; tridimethylphenyllead, titanium tetrachloride and titanium tetraiodide; diphenylmagnesium and titanium tetraiodide; di-n-propylmagnesium, titanium tetrachloride and titanium tetraiodide; dimethylmagnesium, titanium tetrachloride and iodine; diphenylmagnesium, titanium tetrabromide and iodine; methylethylmagnesium, and titanium tetraiodide; dibutylberyllium and titanium tetraiodide; diethylcadmium and titanium tetraiodide; diisopropylcadmium and titanium tetraiodide; triisobutylaluminum, titanium tetrachloride, and antimony triiodide; triisobutylaluminum, titanium tetrachloride and aluminum triiodide; triisobutylaluminum, titanium tetrabromide, and aluminum triiodide; triethylaluminum, titanium tetrachloride, and phosphorus triiodide; tri-n-dodecylaluminum, titanium tetrachloride, and tin tetraiodide; triethylgallium, titanium tetrabromide, and aluminum triiodide; tri-n-butylaluminum, titanium tetrachloride, and antimony triiodide; tricyclopentylaluminum, titanium tetrachloride, and silicon tetraiodide; triphenylaluminum, titanium tetrachloride, and gallium triiodide; triisobutylaluminum, titanium tetraiodide and tin tetrachloride; triisobutylaluminum, titanium tetraiodide and antimony trichloride; triisobutylaluminum, titanium tetraiodide and aluminum trichloride; triisobutyl aluminum, titanium tetraiodide, and tin tetrabromide; triethylgallium, titanium tetraiodide, and aluminum tribromide; triethylaluminum, titanium tetraiodide, and arsenic trichloride; and tribenzylaluminum, titanium tetraiodide, and germanium tetrachloride.

The polymerization process for preparing cis-polybutadiene is carried out in the presence of a hydrocarbon diluent which is not deleterious to the catalyst system. Examples of suitable diluents include aromatic, paraffinic, and cycloparaffinic hydrocarbons, it being understood that mixtures of these materials can also be used. Specific examples of hydrocarbon diluents include benezene, toluene, n-butane, isobutane, n-pentane, isooctane, n-dodecane, cyclopentane, cyclohexane, methylcyclohexane, and the like. It is often preferred to employ aromatic hydrocarbons as the diluent.

The amount of catalyst used in preparing the cis-polybutadiene product can vary over a rather wide range. The amount of the organometal used in the catalyst composition is usually in the range of 1.0 to 20 mols per mol of the halogen-containing component, i.e., a metal halide with or without a second metal halide or elemental iodine. However, a preferred mol ratio is from 2.5:1 to 12:1 of the organometal compound to the halogen-containing component. When using a catalyst comprising an organometal compound and more than one metal halide, e.g., titanium tetrachloride and titanium tetraiodide, titanium tetrachloride or tetrabromide and aluminum iodide or titanium tetraiodide and aluminum chloride, the mol ratio of the chloride or bromide to the iodide is usually in the range of 0.05:1 to 5:1 with the mol ratio of the chloride or bromide of a metal other than titanium to titanium tetraiodide being at least 0.5:1. With a catalyst system comprising an organometal compound, a titanium chloride or bromide and elemental iodine, the mol ratio of titanium halide to iodine is generally in the range of 10:1 to 0.25:1, preferably 3:1 to 0.25:1. The concentration of the total catalyst composition, i.e., organometal and halogen-containing component, is usually in the range of 0.01 to 10 weight percent, preferably in the range of 0.01 to 5 weight percent, based on the total amount of 1,3-butadiene charged to the reactor system.

The process for preparing cis-polybutadiene can be carried out at temperatures varying over a rather wide range, e.g., from −100 to 250° F. It is usually preferred to operate at a temperature in the range of −30 to 160° F. The polymerization reaction can be carried out under autogenous pressure or at any suitable pressure sufficient to maintain the reaction mixture substantially in the liquid phase. The pressure will thus depend upon the particular diluent employed and the temperature at which the polymerization is conducted. However, higher pressures can be employed if desired, these pressures being obtained by some such suitable method as the pressurization of the reactor with a gas which is inert with respect to the polymerization reaction.

Various materials are known to be detrimental to the catalyst employed in preparing the cis-polybutadiene. These materials include carbon dioxide, oxygen and water. It is usually desirable, therefore, that the butadiene and the diluent be freed of these materials as well as other materials which may tend to inactivate the catalyst. Furthermore, it is desirable to remove air and moisture from the reaction vessel in which the polymerization is to be conducted. Upon completion of the polymerization reaction, the reaction mixture is then treated to inactivate the catalyst and recover the rubbery polymer. According to our invention the catalyst is inactivated by adding to the reaction mixture an oxirane compound or an anhydride. Any kind of oxirane compound can be used provided it contains at least one

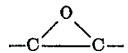

group per molecule. It is preferred that the rest of the molecule by hydrocarbon or a compound made up solely of carbon, oxygen and hydrogen. While liquids are frequently preferred because of their ease of addition and dispersion throughout the reaction mixture, solids can also be employed. Examples of such compounds include ethylene oxide, propylene oxide, glycidaldehyde, epoxidized polybutadienes, epoxidized fatty acids or fatty esters such as vegetable oils, or the like. As stated above, oxygen can be present in the molecule in forms other than as epoxy groups, for example, the oxygen can also be present in an ether linkage, a carboxy group, an aldehyde group, a keto group or in an ester linkage. Suitable compounds of this type are commercially available.

The anhydrides which can be used in this process are the mono- and polyanhydrides such as acetic anhydride, stearic anhydride, succinic anhydride, benzoic anhydride, phthalic anhydride, pyromellitic dianhydride, or polyanhydrides such as are formed by the polymerization of styrene with maleic anhydride, and the like. Any anhydride to be suitable must contain one or more

groups and the remainder of the molecule can be hydrocarbon or consist of carbon, oxygen and hydrogen such as described above in connection with oxirane compounds. The anhydrides also can be either liquid or solid.

The amount of shortstopping agent employed is generally in the range of 0.1 to 1 part by weight per 100 parts of rubber and preferably about 0.15 to 0.6 part per 100 parts of rubber. After the shortstopping agent has been added at the conclusion of the polymerization the polymer is recovered by conventional methods such as steam stripping, alcohol coagulation, and the like.

In order to illustrate further the advantage of our invention, the following examples are presented. The conditions and proportions of these examples are typical only and should not be construed to limit our invention unduly.

Toluene was charged first, the reactor was purged with nitrogen, butadiene was added, and then triisobutylaluminum, iodine, and titanium tetrachloride in the order named. At the close of the reaction period, one run in each series was shortstopped with isopropyl alcohol and used as a control. Different materials were used as shortstopping agents in the other runs. After shortstopping, the polymers were coagulated with isopropyl alcohol, separated, 0.5 part by weight per 100 parts rubber of an antioxidant, either 2,2'-methylene-bis(4-methyl-6-tert-butylphenol) or 4,4'-methylene-bis(2,6-di-tert-butylphenol) was incorporated into the wet polymer, and the products were dried. The runs are summarized in Table I (blanks indicate that tests were not made):

TABLE I

| Run No. | TBA/I$_2$/TTC m.h.m. | Shortstop Type | Shortstop P.h.r. | Antioxidant [1] | Polymer [2] color | Inherent viscosity | Mooney (ML-4 at 212° F.) | Cold flow (mg./min.) |
|---|---|---|---|---|---|---|---|---|
| 1 | 1.5/0.53/0.3 | Isopropyl alcohol | Excess | B | 4 | | | 2.3 |
| 2 | 1.5/0.53/0.3 | Epoxol 9-5 [3] | 0.3 | B | 0 | | 56 | 0.9 |
| 3 | 2.2/0.65/0.37 | Isopropyl alcohol | Excess | A | 5 | 2.32 | 37 | 4.3 |
| 4 | 2.2/0.65/0.37 | Oxiron 2002 [4] | 0.5 | A | 0 | 2.89 | 42 | 1.9 |
| 5 | 2.2/0.65/0.37 | Epoxol 7-4 [5] | 0.5 | A | 1 | 2.39 | 39 | 2.7 |
| 6 | 2.2/0.65/0.37 | Propylene oxide | 0.5 | A | 2 | 2.73 | 41 | 1.5 |
| 7 | 2.2/0.65/0.37 | Isopropyl alcohol | Excess | A | 5 | 2.32 | 37.6 | 6.5 |
| 8 | 2.2/0.65/0.37 | SMA 1000 [6] | 0.4 | A | 5 | 2.39 | 42.4 | 2.7 |
| 9 | 2.3/0.68/0.39 | Isopropyl alcohol | Excess | A | 5 | 2.25 | 35 | 4.4 |
| 10 | 2.3/0.68/0.39 | Ethylene oxide | 0.2 | A | 3 | 2.34 | 45 | 2.5 |
| 11 | 2.3/0.68/0.39 | Isopropyl alcohol | Excess | A | 5 | 2.31 | 40 | 4.0 |
| 12 | 2.3/0.68/0.39 | Glycidaldehyde | 0.3 | A | 6 | 2.45 | 46 | 1.6 |
| 13 | 2.3/0.68/0.39 | Isopropyl alcohol | Excess | B | 4 | 2.29 | 36 | 5.5 |
| 14 | 2.3/0.68/0.39 | Oxiron 2000 [4] | 0.2 | B | 0 | 2.39 | 41 | 1.9 |
| 15 | 2.3/0.68/0.39 | Oxiron 2000 [4] | 0.3 | B | 0 | | 39 | 2.4 |
| 16 | 2.3/0.68/0.39 | Oxiron 2000 [4] | 0.5 | B | 0 | | 40 | 2.3 |
| 17 | 2.3/0.68/0.39 | Isopropyl alcohol | Excess | B | 4 | 2.23 | 33 | 4.8 |
| 18 | 2.3/0.68/0.39 | Epoxol 7-4 [5] | 0.2 | B | 1 | 2.32 | 36 | 3.5 |
| 19 | 2.3/0.68/0.39 | Epoxol 7-4 [5] | 0.3 | B | 1 | 2.34 | 36 | 3.1 |
| 20 | 2.3/0.68/0.39 | Epoxol 7-4 [5] | 0.5 | B | 1 | 2.37 | 37 | 3.3 |
| 21 | 2.30/0.68/0.39 | Isopropyl alcohol | Excess | B | 4 | 2.34 | 37 | 5.1 |
| 22 | 2.3/0.68/0.39 | Propylene oxide | 0.2 | B | 1 | 2.35 | 41 | 1.8 |
| 23 | 2.3/0.68/0.39 | Propylene oxide | 0.3 | B | 1 | 2.39 | 42 | 2.1 |
| 24 | 2.3/0.68/0.39 | Propylene oxide | 0.5 | B | 1 | 2.32 | 41 | 1.9 |
| 25 | 2.5/0.73/0.41 | Isopropyl alcohol | Excess | A | 5 | 2.57 | 48 | 2.7 |
| 26 | 2.5/0.73/0.41 | Oxiron 2001 [4] | 0.43 | A | 0 | 2.46 | 44 | 1.9 |

[1] Two antioxidants employed:
 A = 2,2'-methylene-bis (4-methyl-6-tert-butylphenol).
 B = 4,4'-methylene-bis (2,6-di-tert-butylphenol).
[2] Numbers designate color rating with 5 representing the color of a normal control sample, i.e., dark yellow or amber, obtained when a polymerization is shortstopped with isopropyl alcohol, water, or rosin acid. Lower numbers indicate less color with 0 indicating that the polymer was substantially colorless.
[3] Product of Swift and Co. A polyepoxidized vegatable oil having a viscosity at 25° C. of 8.8 poises, a specific gravity of 1.020, an epoxy content of 9.0 percent (oxirane oxygen), Saponification No. of 176 (maximum), and a Gardner color less than 1. Averages over 5 epoxy groups per molecule.
[4] Oxiron 2000, 2001, and 2002, liquid epoxidized polybutadienes, products of Food Machinery and Chemical Corp.

| | Oxiron 2000 | Oxiron 2001 | Oxiron 2002 |
|---|---|---|---|
| Appearance | (b) | (c) | (c) |
| Viscosity, poises at 25° C | 1,800 | 160 | 15 |
| Epoxy content, percent (oxirane oxygen) | 9.0 | 11.0 | 6.9 |
| Epoxy equivalent [a] | 177 | 145 | 232 |

[a] Number of grams of resin containing one gram mole of epoxide.
[b] Amber liquid.
[c] Light yellow liquid.

[5] Product of Swift and Co. Epoxidized soybean oil averaging over 4 epoxy groups per molecule and having a viscosity at 25° C. of 3.7 poises, an epoxy content of 7 percent (oxirane oxygen), saponification number of 180 (maximum), and a Gardner color less than 1.
[6] Styrene-maleic anhydride copolymer with 8 repeating units of styrene and maleic anhydride. Product of Texas Butadiene and Chemical Co.

*Example I*

Several series of runs were made for the polymerization of butadiene in which different initiator levels and different polymerization shortstops were used. The polymerization recipe was as follows:

1,3-butadiene, parts by weight _____ 100
Toluene, parts by weight _____ 1100
Triisobutylaluminum (TBA), m.h.m.[1] _____ Variable
Iodine (I$_2$), m.h.m.[1] _____ Variable
Titanium tetrachloride (TTC), m.h.m.[1] _____ Variable
Temperature, ° F. _____ 41
Time, hours _____ 16
Conversion, percent _____ 97–100

[1] Millimoles per 100 parts monomer.

In this and the following examples cold flow was measured by extruding the rubber through a ¼ inch orifice at 3.5 pounds per square inch pressure and a temperature of 50° C. (122° F.). After allowing 10 minutes to reach steady state, the rate of extrusion was measured and the values reported in milligrams per minute.

These data show that in all cases a significant reduction in cold flow resulted when the shortstopping agents of the invention were employed. All products had a lighter color except those obtained when the shortstopping agents were glycidaldehyde and the styrene-maleic anhydride copolymer (SMA 1000).

*Example II*

Butadiene was polymerized using the recipe of Example

I with the amounts of triisobutylaluminum, iodine, and titanium tetrachloride being 2.2, 0.65, and 0.037 m.h.m., respectively. Polymerization was effected at 41° F. for 5 hours and the conversion was 94 percent. The reaction was shortstopped with Oxiron 2000 and the polymer was recovered as in the preceding example with 0.5 p.h.r. antioxidant being incorporated into the wet polymer. The product had an inherent viscosity of 2.43, cis content of 94.9 percent, trans content of 3.2 percent, and vinyl content of 1.9 percent.

The foregoing polymer and a commercial cis-polybutadiene having about 95 percent cis content prepared with the same type of initiator system and shortstopped with rosin acid, were evaluated in a tread stock recipe. The stocks were mixed in a Midget Banbury at 250° F. and 45 r.p.m. in an 8-minute cycle. Rubber, carbon black, and chemicals (except curatives) were added at zero time and the Philrich 5 at 2 minutes. Raw polymer properties, processing data, and physical properties of the vulcanizates were obtained. Results are summarized in Table II.

TABLE II

COMPOUNDING RECIPES, PARTS BY WEIGHT

|  | Polymer shortstopped with— | |
| --- | --- | --- |
|  | Oxiron 2000 | Rosin acid |
| Polymer | 100 | 100 |
| High abrasion furnace black | 50 | 50 |
| Zinc oxide | 3 | 3 |
| Stearic acid | 1 | 1 |
| Flexamine [1] | 1 | 1 |
| Resin 731 D [2] | 5 | 5 |
| Philrich 5 [3] | 5 | 5 |
| Sulfur | 1.75 | 1.75 |
| NOBS Special [4] | 1.0 | 1.05 |

RAW POLYMER PROPERTIES

| ML-4 at 212° F | 43 | 46.5 |
| --- | --- | --- |
| Cold flow, mg./min | 2.5 | 3.6 |

COMPOUNDED STOCKS

| MS-1 ½ at 212° F | 37.0 | 49.5 |
| --- | --- | --- |
| Scorch at 280° F. min | 15.6 | 12.0 |
| Extrusion at 250° F.: |  |  |
| Inches/min | 38.8 | 43.6 |
| Grams/min | 100.0 | 105.5 |
| Rating (Garvey Die) | 11+ | 6 |

PHYSICAL PROPERTIES, CURED 30 MINUTES AT 307° F.

| $\nu \times 10^4$, moles/cc | 2.01 | 2.13 |
| --- | --- | --- |
| 300% Modulus, p.s.i | 1,285 | 1,265 |
| Tensile, p.s.i | 2,480 | 2,420 |
| Elongation, percent | 450 | 450 |
| 200° F. max. tensile, p.s.i | 1,390 | 1,180 |
| $\Delta T$, ° F | 47.9 | 45.6 |
| Resilience, percent | 74.2 | 75.9 |
| Shore A hardness | 60.5 | 61.5 |

[1] Physical mixture containing 65 percent of a complex diarylamine-ketone reaction product and 35 percent of N, N'-diphenyl-p-phenylenediamine.
[2] Disproportionated pale rosin stable to heat and light.
[3] Aromatic oil.
[4] N-oxydiethylene-2-benzothiazyl sulfenamide.

The polymer shortstopped with epoxidized polybutadiene had lower cold flow and better processing properties than the polymer shortstopped with rosin acid. Properties of the vulcanizates were similar.

*Example III*

Butadiene was polymerized as described in Example II except that the reaction time was 16 hours and the conversion was 98 percent. The reaction was shortstopped with propylene oxide and antioxidant was added as in the preceding example. The product had an inherent viscosity of 2.48, cis content of 94.2 percent, trans content of 2.7 percent, and vinyl content of 3.1 percent.

This polymer was evaluated in the same tread stock recipe used for the commercial cis-polybutadiene of Example II. A sample of commercial polymer of the same type as used in Example II was evaluated at the same time for comparative purposes. The results are summarized in Table III:

TABLE III

RAW POLYMER PROPERTIES

|  | Polymer shortstopped with— | |
| --- | --- | --- |
|  | Propylene oxide | Rosin acid |
| ML-4 at 212° F | 42.8 | 45 |
| Cold flow, mg./min | 1.9 | 3.6 |

COMPOUNDED STOCKS

| MS-1 ½ at 212° F | 31.5 | 42.5 |
| --- | --- | --- |
| Scorch at 280° F., min | 26.4 | 16.7 |
| Extrusion at 250° F.: |  |  |
| Inches/min | 37.5 | 44.5 |
| Grams/min | 98.0 | 109.0 |
| Rating (Garvey Die) | 9 | 5 |

PHYSICAL PROPERTIES, CURED 30 MINUTES AT 307° F.

| $\nu \times 10^4$, moles/cc | 1.98 | 1.95 |
| --- | --- | --- |
| 300% Modulus, p.s.i | 1,175 | 1,125 |
| Tensile, p.s.i | 2,340 | 2,675 |
| Elongation, percent | 470 | 505 |
| 200° F. max., tensile, p.s.i | 1,320 | 1,415 |
| $\Delta T$, ° F | 43.9 | 42.9 |
| Resilience, percent | 78.7 | 79.7 |
| Shore A hardness | 59.5 | 60.0 |

The polymer shortstopped with propylene oxide and lower cold flow and better extrusion appearance than the rosin acid shortstopped polymer. Most of the properties of the vulcanizates were similar.

The microstructure of each cis-polybutadiene referred to in the examples was determined by dissolving a sample of the polymer in carbon disulfide so as to form a solution having 25 grams of polymer per liter of solution. The infrared spectrum of the solution (percent transmission) was then determined in a commercial infrared spectrophotometer.

The percent of the total unsaturation present as trans 1,4- was calculated according to the following equation and consistent units:

$$\epsilon = \frac{E}{tc}$$

where $\epsilon$=extinction coefficient (liters-mols$^{-1}$-centimeters$^{-1}$); $E$=extinction ($\log I_o/I$); $t$=path length centimeters); and $c$=concentration (mols double bond/liter). The extinction was determined at the 10.35 micron band and the extinction coefficient was 146 (liters-mols$^{-1}$-centimeters$^{-1}$).

The percent of the total unsaturation present at 1,2- (or vinyl) was calculated according to the above equation, using the 11.0 micron band and an extinction coefficient of 209 (liters-mols$^{-1}$-centimeters$^{-1}$).

The percent of the total unsaturation present as cis 1,4- was obtained by subtracting the trans 1,4- and 1,2- (vinyl) determined according to the above procedure from the theoretical unsaturation, assuming one double bond per each $C_4$ unit in the polymer.

As will be apparent to those skilled in the art from the above disclosure various modifications can be made in our invention without departing from the spirit or scope thereof.

We claim:
1. A method of terminating the polymerization of butadient in the presence of an organometallic catalyst system containing iodine, said catalyst system being effective to produce butadiene polymers having at least 85 percent cis-1,4 addition which comprises adding to the reaction mixture a compound of carbon, oxygen and hydrogen selected from the group consisting of oxirane compounds and anhydrides, said compound being added at the conclusion of said polymerization in an amount of from 0.1 to 1 part by weight per 100 parts of polymer formed.

2. The method of claim 1 wherein said catalyst system contains a titanium halide.

3. The method of making polybutadiene which comprises shortstopping the polymerization of butadiene in the presence of an iodine-containing catalyst system which forms on mixing components including an organometal and titanium halide, said catalyst system being effective to produce butadiene polymers having at least 85 percent cis-1,4 addition by adding to the polymerization mixture a compound of carbon, oxygen and hydrogen containing at least one

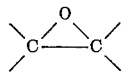

group, and recovering the butadiene polymer from said mixture, the amount of said compound used being in the range of 0.1 to 1 part by weight per 100 parts of said polymer.

4. The method of claim 3 wherein said compound is liquid epoxidized polybutadiene.

5. The method of claim 3 wherein said compound is epoxidized vegetable oil.

6. The method of claim 3 wherein said compound is propylene oxide.

7. The method of claim 3 wherein said compound is ethylene oxide.

8. The method of claim 3 wherein said compound is glycidaldehyde.

9. The method of making polybutadiene which comprises shortstopping the polymerization of butadiene in the presence of an iodine-containing catalyst system which forms on mixing components including an organometal and titanium halide, said catalyst system being effective to produce butadiene polymers having at least 85 percent cis-1,4 addition by adding to the polymerization mixture a compound of carbon, oxygen and hydrogen containing at least one

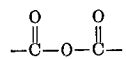

group, and recovering the butadiene polymer from said mixture, the amount of said compound used being in the range of 0.1 to 1 part by weight per 100 parts of said polymer.

10. The method of claim 9 wherein said compound is a styrene/maleic anhydride copolymer.

11. The method of making polybutadiene having reduced tendency to cold flow wherein the butadiene is polymerized in the presence of an iodine containing organometallic catalyst system which forms on mixing components including an organometal compound of a metal selected from the group consisting of aluminum, mercury, zinc, beryllium, cadmium, magnesium, sodium, potassium, lead, gallium, indium and thallium and a titanium halide which comprises shortstopping the polymerization by adding a compound of carbon, oxygen and hydrogen selected from the group consisting of oxirane compounds and anhydrides, and recovering a polymer having a high cis content, the amount of said material being 0.15 to 0.6 part by weight per 100 parts of said polymer.

12. The method according to claim 11 wherein said organometallic catalyst system is formed by mixing triisobutylaluminum, titanium tetrachloride and iodine, the cis content of the recovered polybutadiene is at least 85 percent, and the Mooney viscosity of the polybutadiene is in the range of 10 to 60 (ML-4 at 212° F.).

13. The method of claim 12 wherein said shortstopping material is a liquid epoxidized polybutadiene.

References Cited by the Examiner

UNITED STATES PATENTS

| 2,974,132 | 3/1961 | Jacobi | 260—94.9 |
| 2,977,349 | 3/1961 | Brockway et al. | 260—94.3 |
| 3,076,795 | 2/1963 | Hall | 260—94.7 |

FOREIGN PATENTS

| 1,215,953 | 11/1959 | France. |

OTHER REFERENCES

Rochow, The Chemistry of Organometallic Compounds, J. Wiley, New York, 1957, p. 278.

JOSEPH L. SCHOFER, *Primary Examiner.*